W. P. HAMMOND.
AUTOMOBILE.
APPLICATION FILED JUNE 7, 1915.

1,167,166.

Patented Jan. 4, 1916.

INVENTOR.

UNITED STATES PATENT OFFICE.

WILLIAM P. HAMMOND, OF PASSAIC, NEW JERSEY.

AUTOMOBILE.

1,167,166.  Specification of Letters Patent.  Patented Jan. 4, 1916.

Application filed June 7, 1915. Serial No. 32,514.

*To all whom it may concern:*

Be it known that I, WILLIAM P. HAMMOND, a citizen of the United States, residing at Passaic, in the county of Passaic and State of New Jersey, have invented certain new and useful Improvements in Automobiles, of which the following, taken in connection with the accompanying sheet of drawings, is a full, clear, and concise description thereof.

My invention relates more particularly to an improved body construction of the stream line type and has for its object to increase the seating accommodations without widening the vehicle beyond the standard width.

To accomplish the objects of the invention set forth, I enlarge the width of the seating compartment of the vehicle by utilizing for the side portions thereof the space now occupied by the conventional running-boards extending along the sides of the body so that in my improved vehicle body the outside portion of the seating compartment is in substantially the same vertical plane with the edges of the fenders or mud-guards while the ends of said fenders or mud-guards merge into the walls of the seating compartment as though forming continuations of running boards. This permits the accommodation of seats for three persons sitting side by side as shown in the accompanying drawings, in which,—

Figure 1:
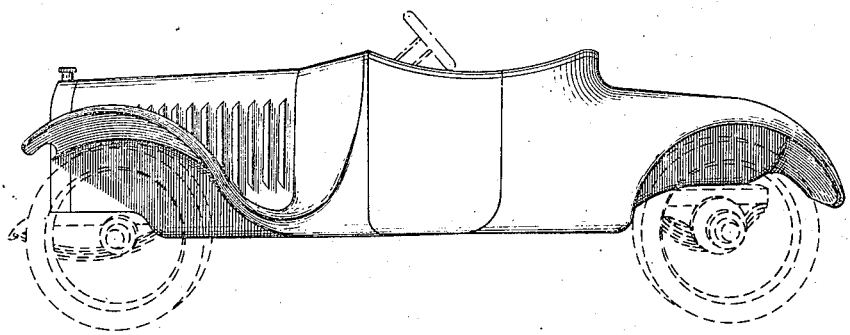
Figure 2:
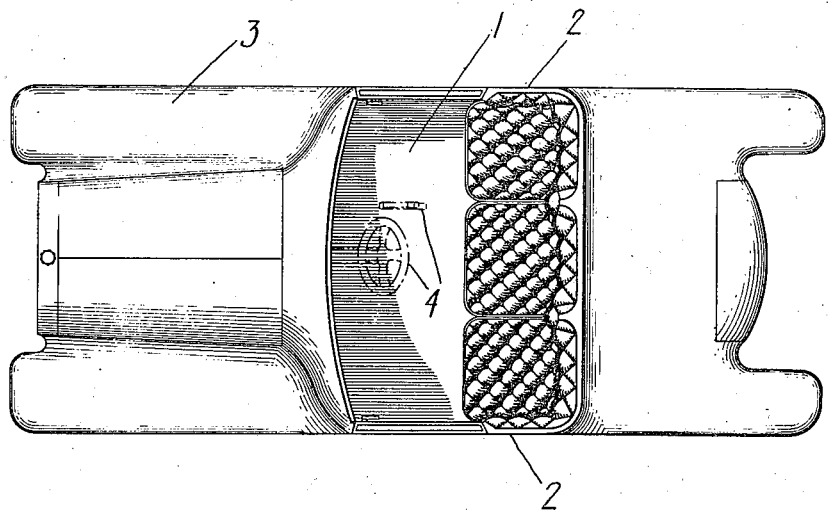

Figure 1 is a view in side elevation of an automobile embodying my invention, and Fig. 2 is a top plan view thereof.

As illustrated, the automobile body is provided with a seating compartment 1, substantially the width of the machine. The outside portions or sides 2 of the seating compartment are substantially in the same vertical plane with the outer edges of the fenders or mud-guards 3. The fenders or mud-guards 3 extend forwardly and rearwardly from the portion of the body forming the seating compartment 1 and preferably merge thereinto, the same being interrupted by the seating compartment.

In the particular embodiment of my invention illustrated I arrange the control mechanism 4 centrally of the seating compartment. It may be observed that the conventional form of side running-boards is dispensed with, and the seating capacity of the body is enlarged by utilizing the space usually occupied by said running-boards. I preferably form the mud-guards of such shape as to have the appearance of merging into the body. By arranging the driver's seat and the control mechanism centrally of the body, a better control of the machine is made possible and also a better view of the road being traveled and judgment of distances may be had by the driver or operator.

I do not desire to limit myself to the exact details of construction illustrated and described as the same may be altered or changed without departing from the spirit and scope of my invention, as defined by the appended claims.

Having thus described my invention, what I claim as new herein and desire to secure by Letters Patent is:—

1. An automobile body having a seating compartment extending the full width and depth of the body and of substantially the same width at the bottom as at the top, said compartment extending laterally to include the space usually occupied by the running-boards common to such bodies, and seats extending the full width of such compartment to provide seating accommodations for three persons side by side, and curved mud guards or fenders having their outer edges in line with the sides of the seating compartment and merging into the walls of the compartment as though forming continuations of running boards.

2. An automobile body having a seating compartment extending the full width of the body, said seating compartment extending laterally to include the width usually occupied by the running-boards common to such bodies, and curved mud guards or fenders having their outer edges in line with the sides of the seating compartment and extending forwardly and rearwardly therefrom, and merging into the walls of the compartment as though forming a continuation of the running-boards.

WILLIAM P. HAMMOND.